Oct. 26, 1954  J. R. LINDBERG ET AL  2,692,679
GRAIN LEVELING DEVICE
Filed July 21, 1950
FIG. 1.
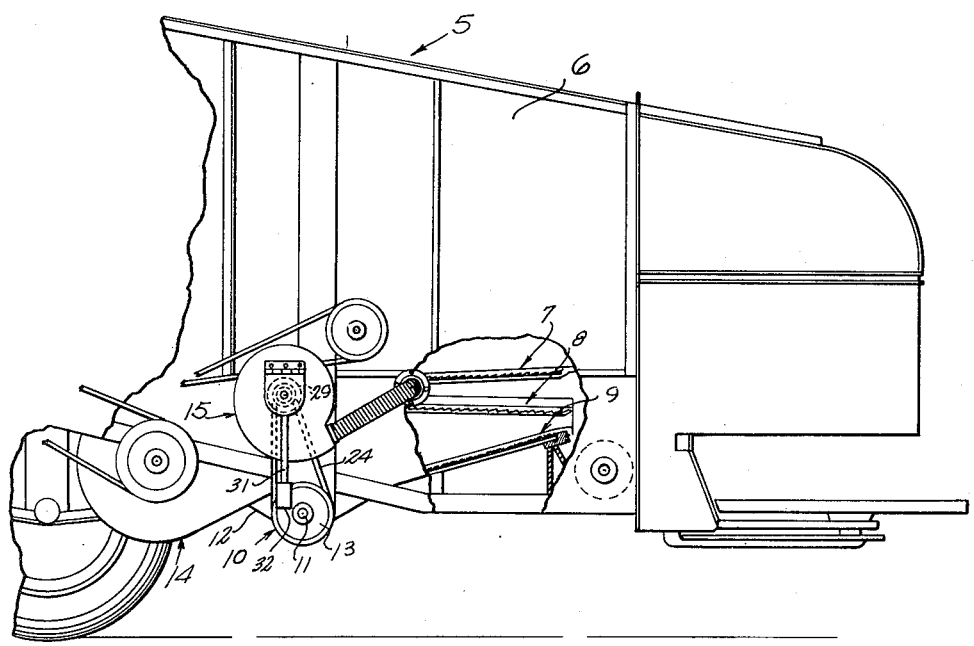
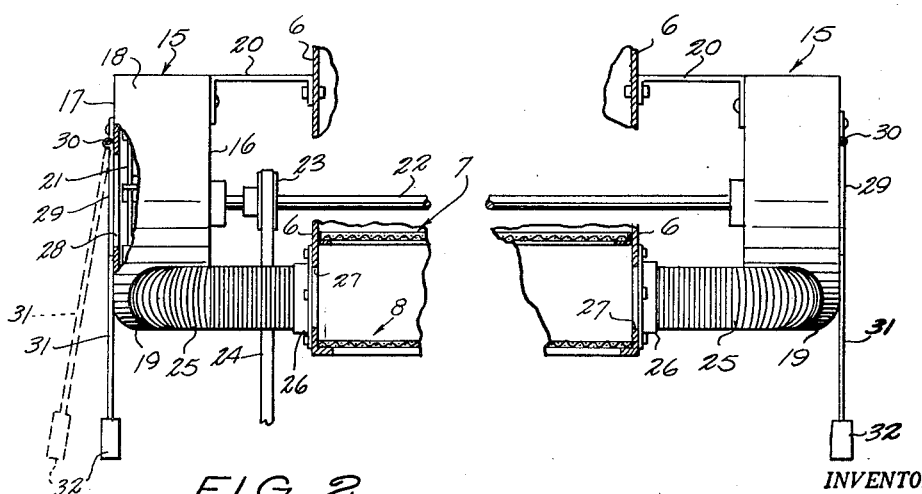
FIG. 2.
INVENTORS
JOHN R. LINDBERG,
ALNER E. LINDBERG,
BY
McMorrow, Berman + Davidson
ATTORNEYS.

Patented Oct. 26, 1954

2,692,679

UNITED STATES PATENT OFFICE 2,692,679

GRAIN LEVELING DEVICE

John R. Lindberg and Alner E. Lindberg, Hawley, Minn.

Application July 21, 1950, Serial No. 175,172

1 Claim. (Cl. 209—261)

This invention relates to a device for maintaining the grain in a level condition on the chaffer sieves of a combine while working on hillsides, and more particularly to a device of this kind which operates automatically in accordance with the amount of tilt of the combine to keep the grain levelled on the chaffer sieves by means of air blasts which prevent the grain from piling up on the downside of the sieves, the primary object of the invention being to provide a practical and efficient device of this kind which can be readily incorporated in combines without major alteration thereof and with a minimum of extra expense.

Other important objects and advantageous features of the invention will be apparent from the following description and the accompanying drawings, wherein, for purposes of illustration only, a specific embodiment of the invention is set forth in detail.

In the drawings, wherein like numerals designate like parts throughout the several views:

Figure 1 is a fragmentary side elevation of a combine, partly broken away, and showing an installation in accordance with the present invention; and Figure 2 is an enlarged and contracted fragmentary transverse vertical section taken through Figure 1.

Referring in detail to the drawings, the numeral 5 generally designates the casing of a combine, having transversely spaced side walls 6, between which are mounted the chaffer sieve 7, the shoe sieve 8, and the weed screen 9, the shoe sieve 8 declining rearwardly in spaced relation below the chaffer sieve 7, and the weed screen 9 declining forwardly in spaced relation below the shoe sieve 8.

Forwardly of the weed screen 9 and at its lower end is mounted the usual grain auger 10 which in the present instance has one end of its shaft 11 extended beyond the auger housing 12 to carry a belt pulley 13. The usual cleaning fan (not shown) is present in the cleaning fan housing 14 located forwardly of the auger housing 12 and supplies the usual air blast rearwardly along the chaffer sieve 7, the shoe sieve 8, and the weed screen 9.

The foregoing is substantially common practice, except for the mounting of the belt pulley 13 on one end of the auger shaft 11. In accordance with the present inventon, blowers 15 are mounted on the outside of the combine casing side walls 6, the blowers involving casings which include inner and outer end walls 16 and 17, respectively, and peripheral walls 18, from which tangential outlets 19 extend rearwardly from the lower part thereof. As shown in Figure 2, the blower casings are mounted on the combine side walls 6 by means of brackets 20 secured by suitable means at one end to the blower casing inner walls 16 and at the other end to the combine side walls 6. The blowers 15 are positioned above and slightly forwardly of the auger housing 12 and its shaft 11.

The blowers 15 include rotors 21 which are mounted on or connected to a common shaft 22 which extends across the combine casing, as shown in Figure 2, and has thereon a belt pulley 23 located outside of the combine casing 5 at the same side thereof as the auger shaft pulley 13, and connected thereto by a belt 24, whereby the blowers 15 are driven from the auger shaft 11.

The tangential blower outlets 19 are connected to the forward ends of flexible pipes 25 having flanged rearward ends 26 which are secured by suitable means to the outer sides of the combine casing side walls 6, in registry with air blast ports or holes 27 formed in these side walls. The holes 27 are located at and between the forward ends of the chaffer sieve 7 and shoe sieve 8, so that air blast from the blowers 15, the combine being in operation, meets the material from opposite sides as it enters upon the sieves.

The outer end walls 17 of the blower casings are formed with centralized air intake openings 28, the blowers being otherwise devoid of air intake means, and these intake openings 28 have closures in the form of valve plates 29 which are horizontally hinged at their upper ends on the outside of the end walls 17 above the holes 28, as indicated at 30. The valve plates 29 are larger than the holes 28 and can have flush engagement with the outer sides of the blower casings around the openings 28, as indicated on Figure 2, whereby the openings 28 are closed so that the blowers are deprived of air and substantially no air blast emerges from the openings 28 which would affect the position of the material on the screens 7 and 8.

Pendulum arms 31, coplanar with the valve plates 29 are rigidly secured to depend from their lower edges, and the lower ends of the arms 31 are provided with weights 32.

In operation, the combine being on level ground, the pendulum weights 32 keep the valve plates 29 in perpendicular positions whereby the air blast openings 28 are closed and no effective air blast is produced through either of the openings 28. However, should the combine be operated on a hill side, wherein the combine is tilted side wise, the pendulum weight 32 of the down side blower 15 will swing to a perpendicular position wherein, as shown in dotted lines in Figure 2, the related valve plate 29 is moved away from the side of the blower casing and thereby uncovers the related air intake hole 28, to a degree corresponding to the amount of tilt of the combine, the pendulum weight 32 of the blower 15 at the upside of the combine acting at the same time to completely close the air intake hole 28 thereof with its valve plate 29.

As a result, the material which, due to the tilt of the combine, would otherwise accumulate or pile up on the down side of the sieves 7 and 8, is levelled on the sieves as it enters thereupon and as it travels rearwardly along the screens, so that the full action of the sieves on the material is assured even while the combine is at a relatively great tilt.

What is claimed is:

In combination with normally level sieve means along which material is to be moved, the sieve means being subject to being tilted toward opposite sides thereof, blower means at the opposite sides of said sieve means comprising blower casings having vertical side walls, conduit means connecting the casings with opposite sides of the sieve means for blowing air onto the sieve means, the said vertical side walls being formed with ports opening into the blower casings for letting outside air into the blower casings, valve plates arranged exteriorly of and dependingly hinged on said side walls at points above said ports for movement toward and away from the adjacent side wall, said valve plates normally covering and closing said ports in a level position of said sieve means, and pendulum weights attached to said valve plates for swinging a valve plate away from closing relation to a port whenever said sieve means is down tilted toward one side thereof.

References Cited in the file of this patent

UNITED STATES PATENTS

| Number | Name | Date |
|---|---|---|
| 885,215 | Amer | Apr. 21, 1908 |
| 1,530,193 | Montgomery | Mar. 17, 1925 |
| 2,310,610 | Bissell | Feb. 9, 1943 |
| 2,611,487 | Stevenson | Sept. 23, 1952 |